H. T. BRIGGS.
Improvement in Wagon-Axles.

No. 127,021. Patented May 21, 1872.

Witnesses:

Inventor:
Harrison T. Briggs
per
Attorneys.

UNITED STATES PATENT OFFICE.

HARISON T. BRIGGS, OF MOLINE, ILLINOIS.

IMPROVEMENT IN WAGON-AXLES.

Specification forming part of Letters Patent No. 127,021, dated May 21, 1872.

*To all whom it may concern:*

Be it known that I, H. T. BRIGGS, of Moline, in the county of Rock Island and in the State of Illinois, have invented certain new and useful Improvements in Axles; and do hereby declare that the following is a full, clear, and exact description thereof, reference being had to the accompanying drawing and to the letters of reference marked thereon, making a part of this specification.

The nature of my invention consists in a bent rod passing over each skein or spindle of a wagon-axle, the ends of each rod being attached to a stay or bridge under the axle, and the two stays connected by a rod having a nut on one or both ends to tighten the same, whereby the axle is very much strengthened.

In order to enable others skilled in the art to which my invention appertains to make and use the same, I will now proceed to describe its construction and operation, referring to the annexed drawing, in which—

Figure 1:
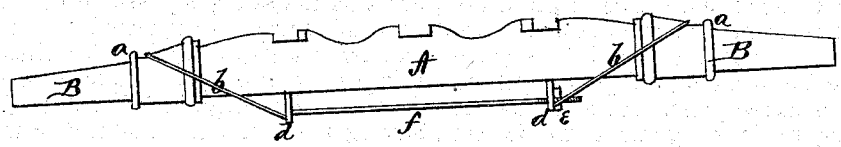
Figure 2:
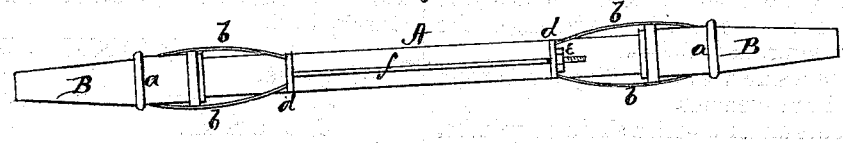

Figure 1 is a side view, and Fig. 2 a bottom view of my improvement.

A represents an axle with a skein or spindle, B, on each end. Over the inner end of each skein or spindle, immediately back of the shoulder $a$ on the same, is passed a bent rod, $b$, the ends of which are attached in any suitable manner to a stay or bridge, $d$. These stays or bridges rest against the under side of the axle A, and are connected by means of a rod, $f$, having upon one or both ends a nut, $e$. By means of these nuts the whole device may be tightened up as far as desired, thereby materially strengthening the axle.

Having thus fully described my invention, what I claim as new, and desire to secure by Letters Patent, is—

The combination, with the axle A, and spindles B B with shoulders on their upper sides, of the stirrups $b\ b$, bridges $d\ d$, rod $f$, and nut $e$, all substantially as shown and described.

In testimony that I claim the foregoing I have hereunto set my hand this 20th day of March, 1872.

HARISON T. BRIGGS.

Witnesses:
J. T. BROWNING,
C. L. EVERT.